US006039001A

United States Patent [19]

Sanford

[11] Patent Number: 6,039,001

[45] Date of Patent: Mar. 21, 2000

[54] TEATCUP LINER WITH DESIRED MOUTHPIECE CHAMBER VACUUM

[75] Inventor: Scott A. Sanford, Oregon, Wis.

[73] Assignee: DEC International, Inc., Madison, Wis.

[21] Appl. No.: 09/081,151

[22] Filed: May 19, 1998

[51] Int. Cl.[7] .......... A01J 5/06

[52] U.S. Cl. .......... 119/14.47; 119/14.49

[58] Field of Search .......... 119/14.47, 14.48, 119/14.49, 14.5, 14.51, 14.52, 14.53

[56] References Cited

U.S. PATENT DOCUMENTS

| | | | |
|---|---|---|---|
| 2,997,980 | 8/1961 | Noorlander . | |
| 3,096,740 | 7/1963 | Noorlander . | |
| 3,659,558 | 5/1972 | Noorlander . | |
| 4,315,480 | 2/1982 | Noorlander . | |
| 4,324,201 | 4/1982 | Larson . | |
| 4,425,872 | 1/1984 | Mills . | |
| 4,530,307 | 7/1985 | Thompson . | |
| 4,537,152 | 8/1985 | Thompson . | |
| 4,745,881 | 5/1988 | Larson . | |
| 4,756,275 | 7/1988 | Larson . | |
| 4,869,205 | 9/1989 | Larson . | |
| 5,069,162 | 12/1991 | Thompson et al. . | |
| 5,178,095 | 1/1993 | Mein . | |
| 5,493,995 | 2/1996 | Chowdhury | 119/14.54 |
| 5,752,462 | 5/1998 | Petersson | 119/14.47 |

FOREIGN PATENT DOCUMENTS

| | | |
|---|---|---|
| 614804 | 12/1926 | France . |

OTHER PUBLICATIONS

"A Comparison Of the Milking Characteristics Of Teat Cup Liners", I. McD. Gibb and G.A. Mein, The Australian Journal Of Dairy Technology, Dec. 1976, pp. 148–153.

"Design of Milking Machines", O'Callaghan, Teagasc Dairy Production Research and Development Division, Moorepark, Fremoy, Co., Cork, Ireland, Published at British Mastitis Conference 1993.

"Dynamic Testing During Milking, An Indicator of Teat Handling", M.D. Rasmussen et al., Danish Institute of Animal Science, Foulum, Denmark, published at *Proc. Symp. Milk Synthesis, Secretion, And Removal In Ruminant*, Univ. Berne, Switzerland, 1996, p. 120, and National Mastitis Council Annual Meeting 1996, pp. 170–171.

"The Relationship Between Mouthpiece Vacuum, Teat Condition, and Udder Health", M.D. Rasmussen, National Mastitis Council Annual Meeting Proceedings, 1997, pp. 91–96.

*Primary Examiner*—Peter M. Poon
*Assistant Examiner*—Yvonne Abbott
*Attorney, Agent, or Firm*—Andrus, Sceales, Starke & Sawall

[57] ABSTRACT

A teatcup liner is provided by an elongated, flexible, generally tubular liner (104) extending along a longitudinal axis (105). The liner has an upper section (106) for mounting to a teatcup, a mouthpiece chamber (107) having a shoulder (108) below the upper section, and a barrel (110) below the shoulder. The barrel has alternating exterior and interior axially extending flutes (112) and (114). The mouthpiece chamber shoulder is fluteless along both its exterior (116) and interior (118).

11 Claims, 6 Drawing Sheets

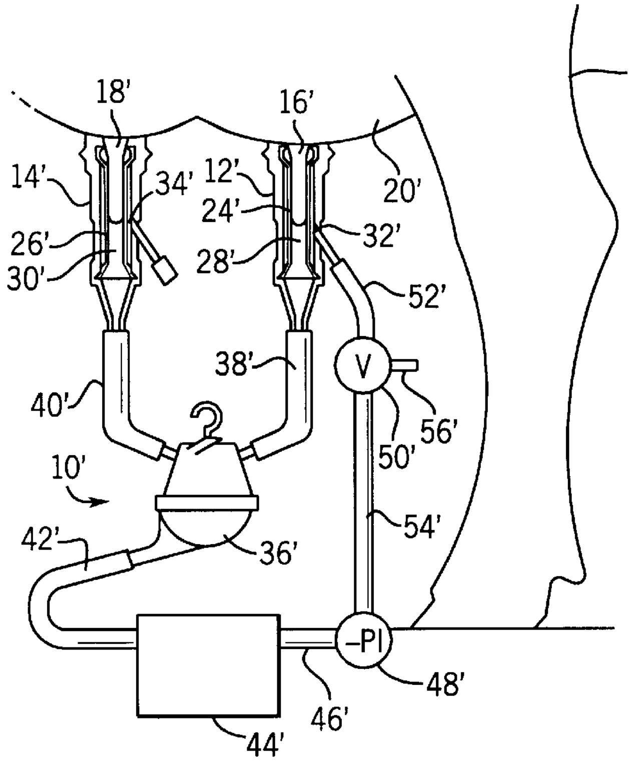
FIG. 1
PRIOR ART
FIG. 2
PRIOR ART
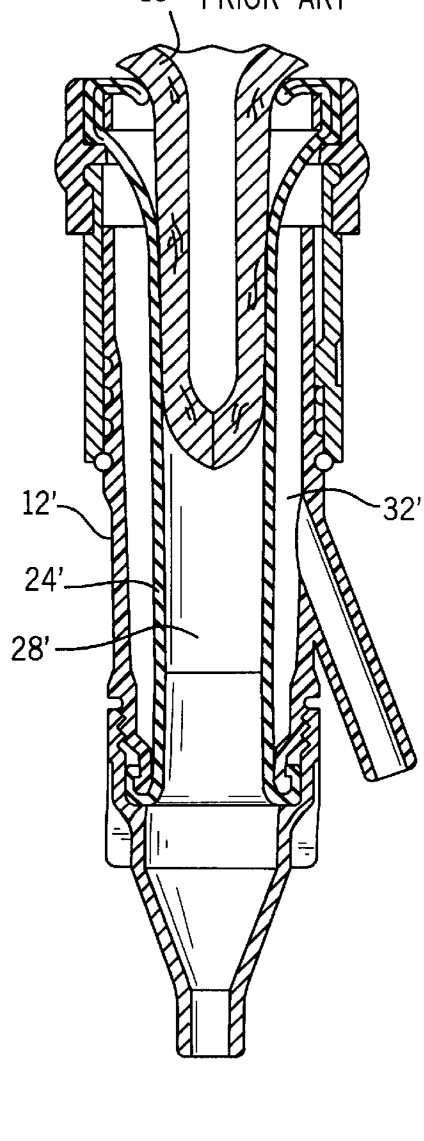

TEATCUP LINER WITH DESIRED MOUTHPIECE CHAMBER VACUUM

BACKGROUND AND SUMMARY

The invention relates to teatcup liners for the milking of mammals, including cows, and more particularly to a teatcup liner maintaining desired mouthpiece chamber vacuum.

Milking systems withdraw milk from the milk secreting glands of mammals by applying negative pressure, i.e. vacuum, to the teat. A plurality of teatcups are provided, each having a liner around a respective teat, and defining a milk flow passage within the liner below the teat, and a pulsation chamber outside the liner between the liner and the teatcup. The milk flow passage within the liner supplies milk to a milking claw which also receives milk from the milk flow passages of other liners of other teatcups.

Simply supplying a constant vacuum to the teat is not desirable because it causes the tissue of the teat to become engorged with blood and lymph. When these fluids are confined to their normal spaces within the teat, the condition is described as congestion. When the fluids leave their normal spaces, it is described loosely as oedema. These conditions may result in pain or discomfort to the mammal being milked, and swelling of the tissue which may constrict the duct through which milk is being withdrawn, thereby slowing the flow of milk. The slowing of milk flow due to the effects of congestion may be accompanied by a reduced volume of milk available for removal because the discomfort may interfere with the milk ejection reflex by which the mammal presents her milk to the teat.

Various attempts have been made to ameliorate the undesirable effects of vacuum on the teat by carefully shaping the teatcup and liner to support the teat as well as possible, and by periodically relieving the vacuum to the teat. The liner periodically collapses around and below the teat, providing massage to the teat. The massage compresses the end of the teat, thereby acting as an "in-line pump" to move accumulated fluid from the tissues of the teat apex. The massaging action of the liner also provides stimulation to the teat whereby the milk ejection reflex is strengthened. In some cases, the milk ejection reflex may be elicited solely by the action of the pulsating liner. Various types of liners are known in the art, for example "A Comparison Of The Milking Characteristics Of Teat Cup Liners" I. McD. Gibb and G. A. Mein, The Australian Journal of Dairy Technology, December, 1976, pages 148–153, and U.S. Pat. Nos. 2,997,980, 3,096,740, 4,315,480, 4,324,201, 4,530,307, 4,745,881, 4,756,275 and 4,869,205. The milking cycle has an on portion and an off portion. Milk is withdrawn from the teat through the liner to the claw during the on portion. During the off portion, the closed liner stops milk flow from the teat.

A teatcup liner is provided by an elongated, flexible, generally tubular liner extending along a longitudinal axis. The liner has an upper section for mounting to a teat cup, a mouthpiece chamber including a shoulder below the upper section, and a barrel below the shoulder. The barrel may be of a smooth circular type, or may be fluted as in U.S. Pat. Nos. 4,530,307, 5,069,162. During peak milk flow, the smooth circular type liner typically has a mean mouthpiece chamber vacuum less than 10 kiloPascals, kPa, for a wide range of teat sizes, while the fluted type liner typically has a mean mouthpiece chamber vacuum in the range of about 20–30 kPa. The smooth circular type has a greater tendency to slip or fall off the teat. In "Design Of Milking Machines", O'Callaghan, Teagasc Dairy Production Research and Development Division, Moorepark, Fermoy, Co., Cork, Ireland, published at British Mastitis Conference 1993, it is indicated that high mouthpiece chamber vacuum levels, i.e. greater than 20 kPa, at the start of milking were associated with liners that gave good cluster stability, i.e. low slips. However, in "The Relationship Between Mouthpiece Vacuum, Teat Condition, and Udder Health", M. D. Rasmussen, National Mastitis Council Annual Meeting Proceedings, 1997, pp. 91–96, it is indicated that cows where high values of mouthpiece chamber vacuum were measured had poor udder health. In "Dynamic Testing During Milking, An Indicator of Teat Handling", M. D. Rasmussen et al., Danish Institute of Animal Science, Foulum, Denmark, published at *Proc. Symp. Milk Synthesis, Secretion, And Removal In Ruminants*, Univ. Beme, Switzerland, 1996, page 120, and National Mastitis Council Annual Meeting 1996, pages 170–171, it is indicated that teat diameter stayed the same after as before milking if the mouthpiece chamber vacuum was less than 20 kPa. The present inventor's conclusion from the various pieces of research is that a mean mouthpiece chamber vacuum greater than 20 kPa seems to be less comfortable to cows, results in more teat congestion and oedema, and has been linked to a higher rate of new mastitis infections. The goal of the present invention is to control the mouthpiece chamber vacuum within the range of 10–20 kPa, for a wide range of teat sizes and shapes, by changes in the teatcup liner geometry to produce a new liner with low slips and which milks cows gently and cleanly.

In U.S. Pat. No. 4,530,307, the flutes extend from just under the retaining ring at the upper section of the liner to the lower end of the barrel. In U.S. Pat. No. 5,069,162, the mouthpiece interior is fluted, and the mouthpiece exterior is smooth. In the present invention, it has been found that by eliminating the flutes on the interior surface of the wall of the mouthpiece chamber of the liner of the noted '162 patent, the mouthpiece chamber vacuum is maintained in the desired range of 10–20 kPa for a wide range of teat shapes and sizes. It is believed that this is caused by the smooth inside diameter at the shoulder of the mouthpiece chamber, instead of flutes, providing a more effective sealing of the teat against the inside of the liner, which in turn reduces the amount of vacuum applied to the teat in the region of the mouthpiece chamber. The mean observed value is in the range of 10–20 kPa, depending on teat size and length. The noted modification is accomplished by a rapid transition from the flutes in the barrel to a smooth inner diameter in the mouthpiece chamber at approximately the tangent point between the shoulder arc and the upper barrel.

BRIEF DESCRIPTION OF THE DRAWINGS

PRIOR ART

FIG. 1 is taken from FIG. 1 of U.S. Pat. No. 5,178,095 and schematically illustrates a milking system known in the prior art.

FIG. 2 is taken from FIG. 2 of the '095 patent and shows a teatcup and liner during the on portion of a milking cycle as known in the prior art.

Figure 3:
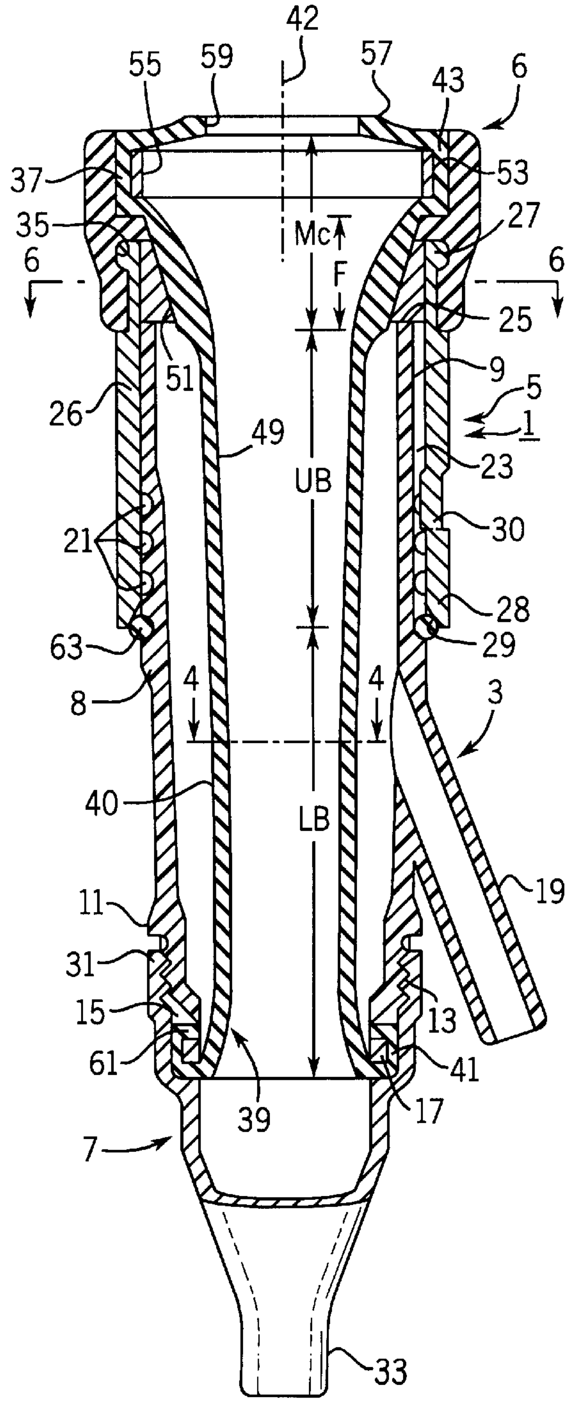

FIG. 3 is taken from FIG. 1 of U.S. Pat. No. 5,069,162 and is a longitudinal crosssectional view of a liner inserted into a teatcup as known in the prior art.

Figure 4:
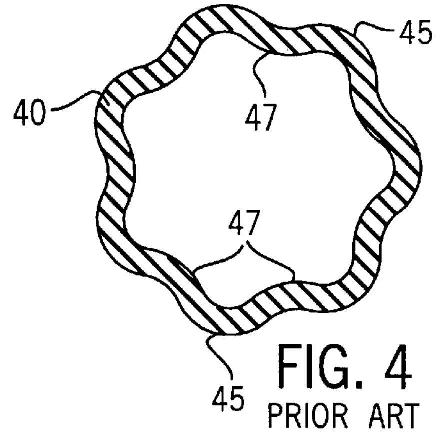

FIG. 4 is taken from FIG. 2 of the '162 patent and is an enlarged cross-sectional view taken along line 4—4 of FIG. 3.

Figure 5:
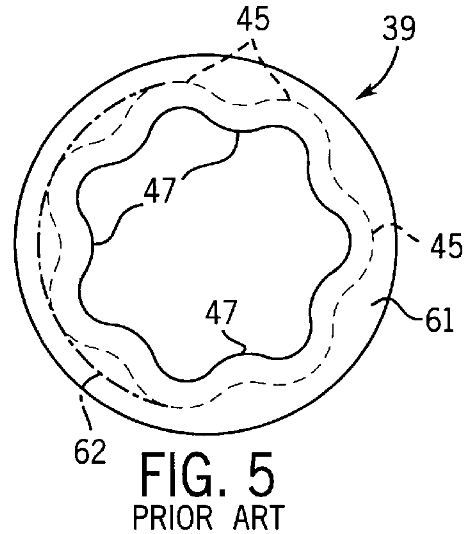

FIG. 5 is taken from FIG. 3 of the '162 patent and is an enlarged view of the lower end of the liner in unassembled condition.

Figure 6:
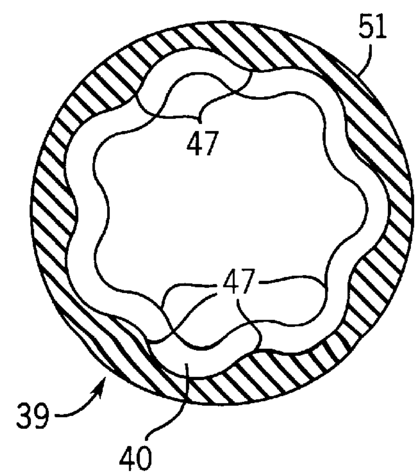

FIG. 6 is taken from FIG. 4 of the '162 patent and is an enlarged cross-sectional view taken along line 6—6 of FIG. 3.

PRESENT INVENTION

Figure 7:
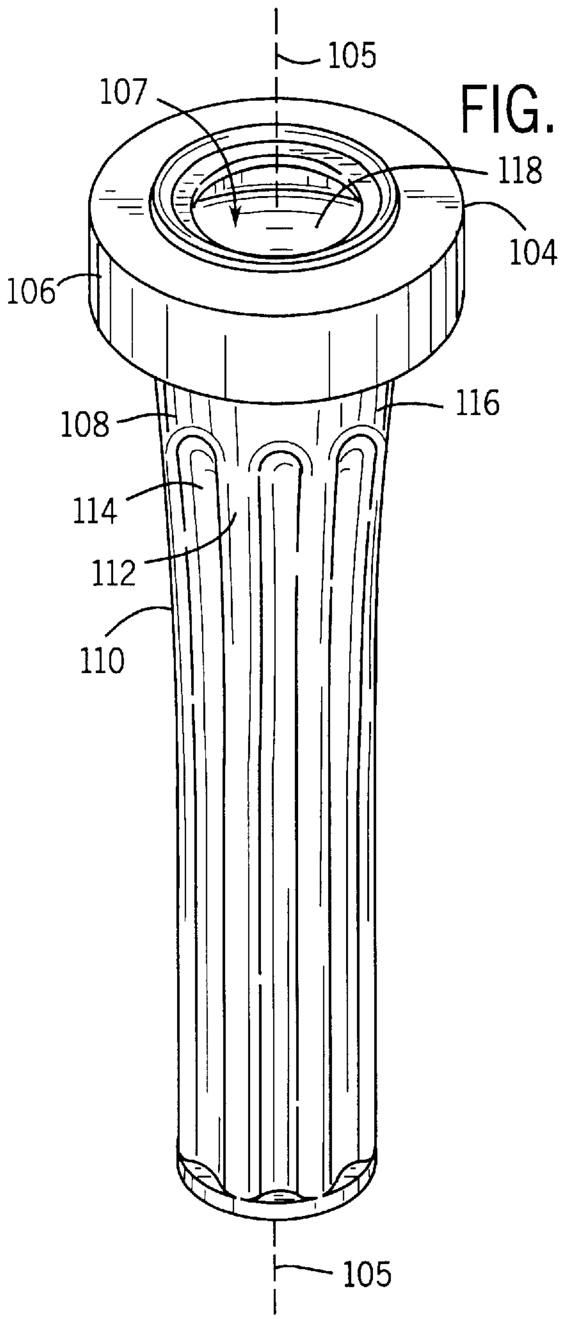

FIG. 7 is an isometric view of a teatcup liner constructed in accordance with the present invention.

Figure 8:
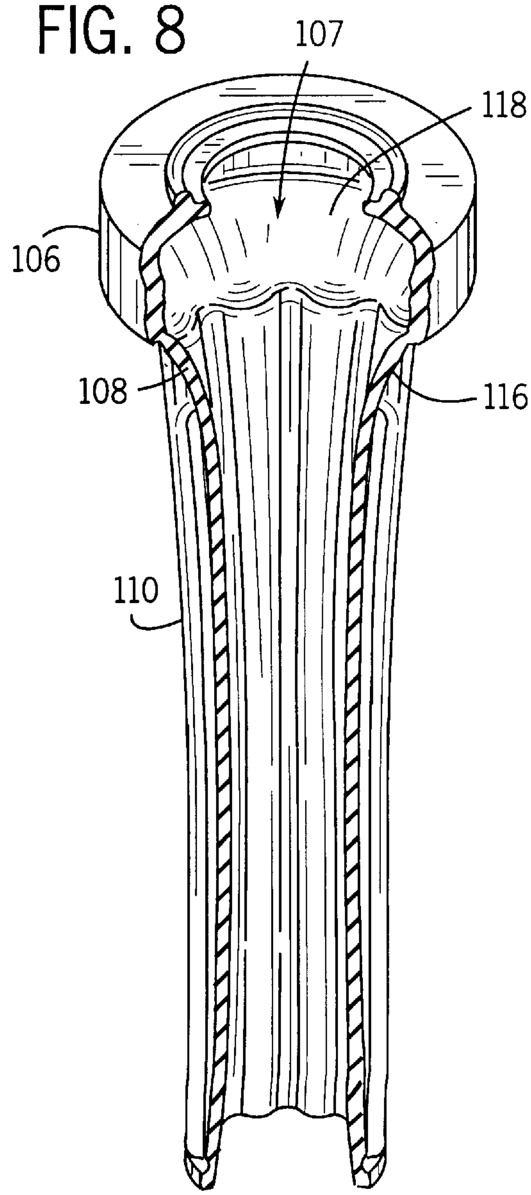

FIG. 8 is a view like FIG. 7, partially cut away.

Figure 9:
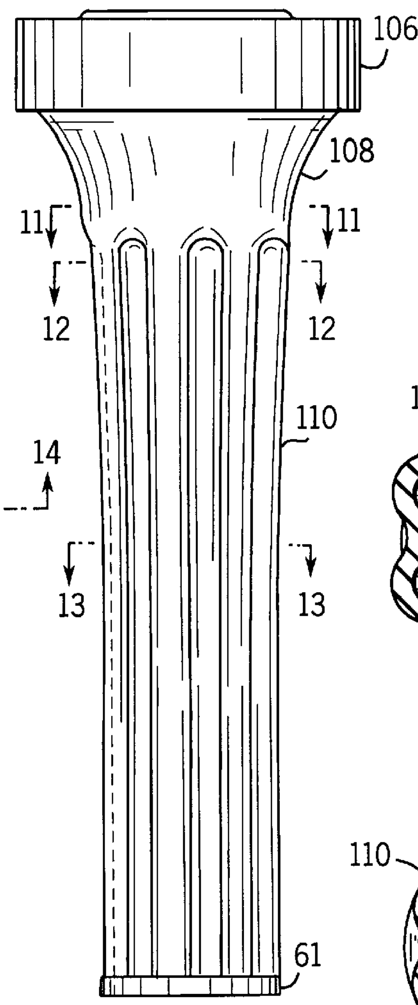

FIG. 9 is a side elevation view of the liner of FIG. 7.

Figure 10:
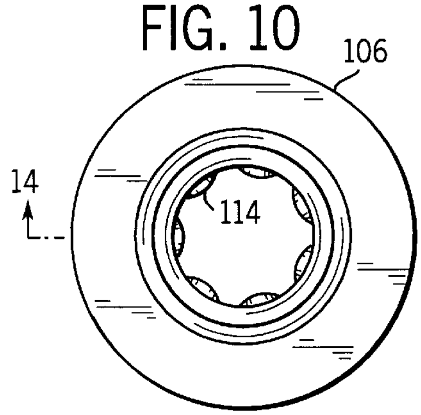

FIG. 10 is a top elevation view of the liner of FIG. 9.

Figure 11:
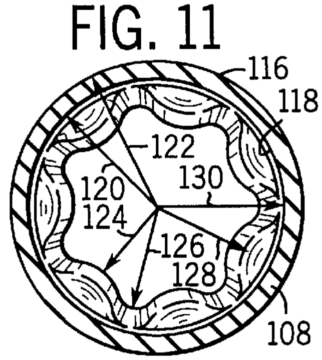

FIG. 11 is a cross-sectional view taken along line 11—11 of FIG. 9.

Figure 12:
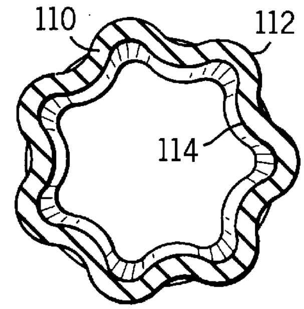

FIG. 12 is a cross-sectional view taken along line 12—12 of FIG. 9.

Figure 13:
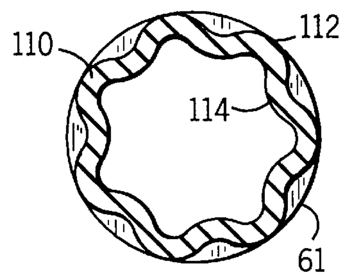

FIG. 13 is a cross-sectional view taken along line 13—13 of FIG. 9.

Figure 14:
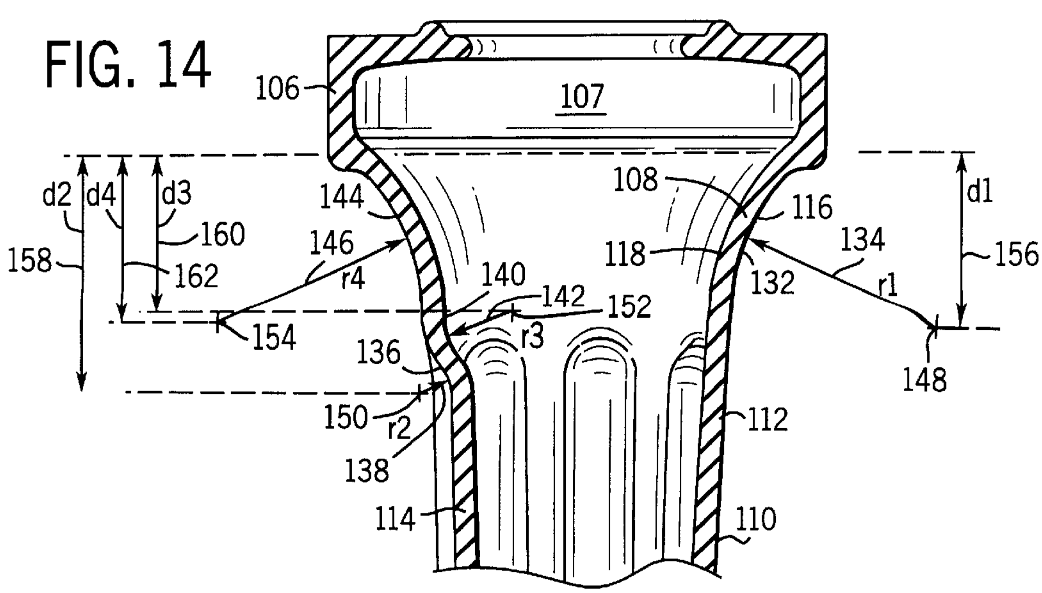

FIG. 14 is a cross-sectional view taken along line 14—14 of FIG. 10.

Figure 15:
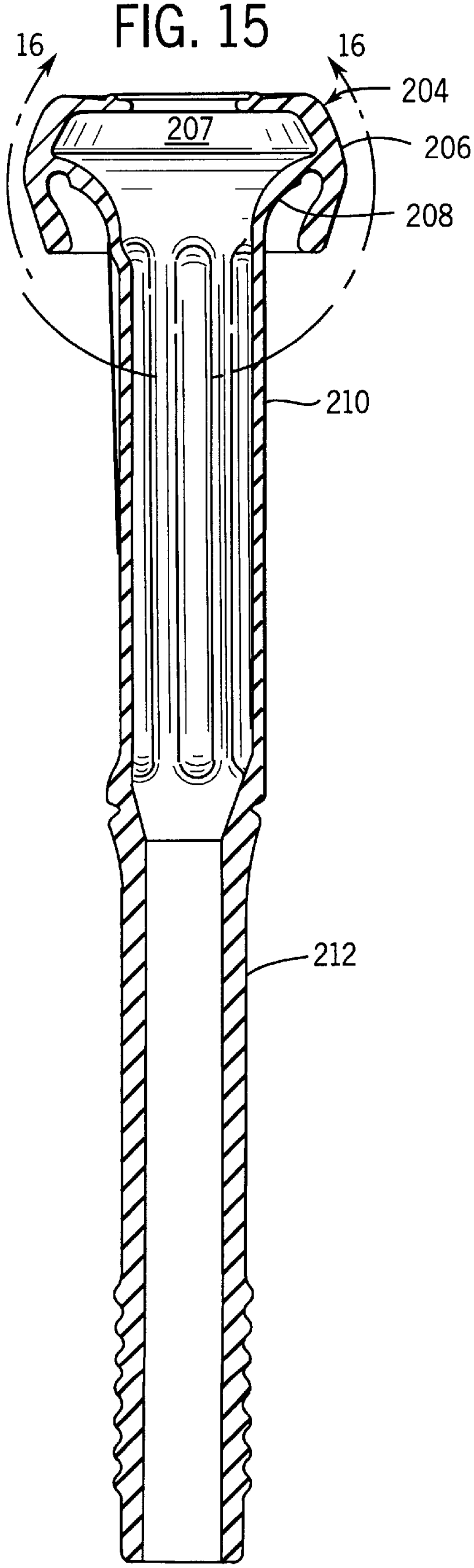

FIG. 15 is a side cross-sectional view of an alternate embodiment of a liner constructed in accordance with the invention.

Figure 16:
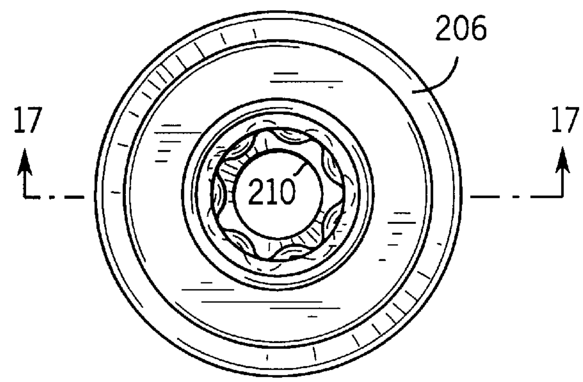

FIG. 16 is a top elevation view of the liner of FIG. 15 as shown at line 16—16.

Figure 17:
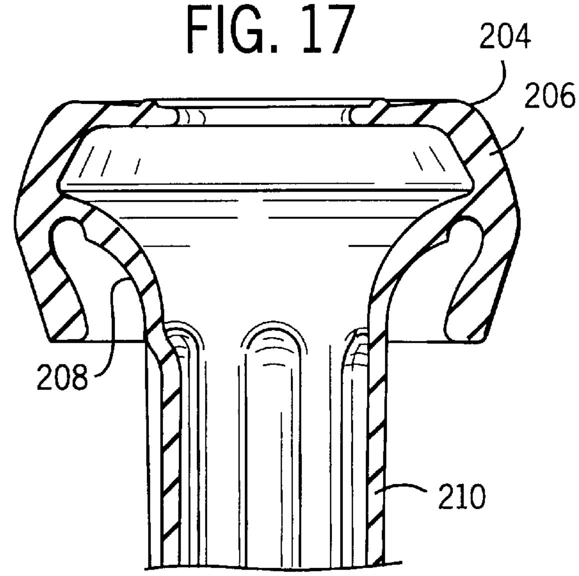

FIG. 17 is an enlarged cross-sectional view taken along line 17—17 of FIG. 16.

Figure 18:
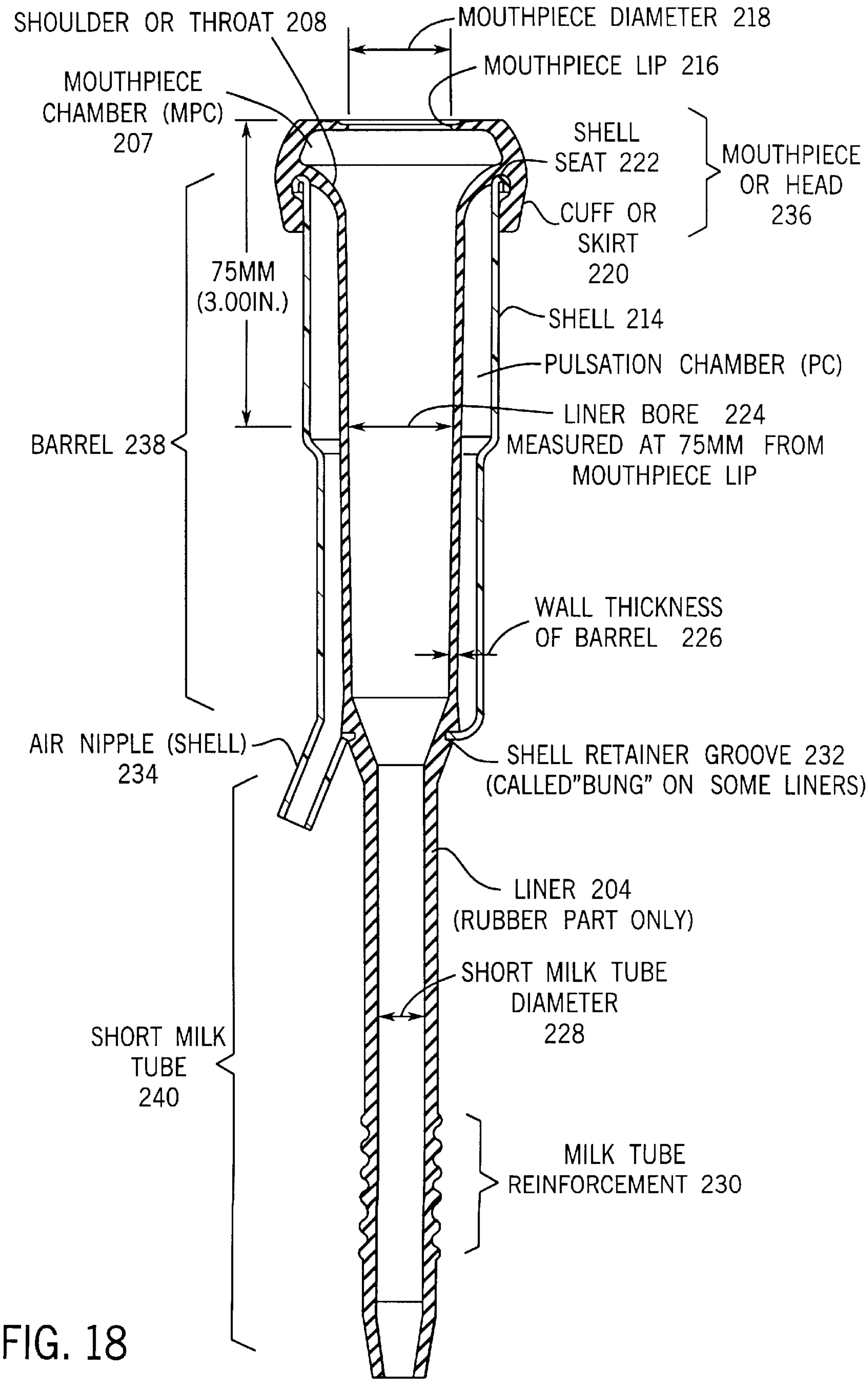

FIG. 18 is a cross-sectional view showing a liner in a teat cup.

DETAILED DESCRIPTION

PRIOR ART

The description relative to FIGS. 1 and 2 is taken from U.S. Pat. No. 5,178,095, incorporated herein by reference, but with the additional prime designation after reference characters. FIG. 1 shows a milking system 10' having a plurality of teatcups such as 12', 14' connected to respective teats such as 16', 18' depending from the udder 20' of a mammal 22' such as a cow. Each teat cup has a liner or inflation such as 24', 26' around a respective teat and defining a milk flow passage such as 28', 30' within the liner below the teat, and a pulsation chamber such as 32', 34' outside the liner between the liner and the teatcup. The teat cup and liner are shown and described in U.S. Pat. No. 4,530,307, incorporated herein by reference. A milking claw 36', for example as shown in U.S. Pat. No. 4,537,152, incorporated herein by reference, has a plurality of inlets receiving milk through tubes such as 38', 40' connected to respective teatcups to receive milk from respective milk flow passages such as 28', 30'. The claw has a discharge tube 42' connected to milk collection container 44' having a vacuum connection tube 46' connected to a source of negative pressure 48'. Negative pressure source 48' applies substantially constant negative pressure (vacuum), relative to atmospheric pressure, through claw 36' to milk flow passages 28', 30'.

The system has a milking cycle with an on portion and an off portion. Milk flows from the teat towards claw 36' during the on portion. A pulsator valve 50' is connected to each of the teat cups at a connection tube such as 52' and has first and second conditions alternately and cyclically connecting the teatcup to the negative pressure source 48' through connection tube 54' during the on portion of the milking cycle, and connecting the teat cup to atmosphere through connection tube 56' during the off portion of the milking cycle. It is also known in the prior art to connect the teatcup to a source of positive pressure, relative to atmospheric pressure, during the off portion of the milking cycle, e.g. by supplying connection tube 56' with a source of positive pressure. During the off portion of the milking cycle, the positive pressure or atmospheric pressure applied through connection tube 56', valve 50', and connection tube 52' to pulsation chamber 32' of teatcup 12' collapses and closes liner 24' below teat 16' to block milk flow, and to relieve the teat from the negative pressure applied from source 48' through connection tube 46', container 44', connection tube 42', claw 36', and connection tube 38' to milk flow passage 28' at the lower end of liner 24'. During the on portion of the milking cycle, negative pressure from source 48' is applied through connection tube 54', valve 50', and connection tube 52' to pulsation chamber 32' of teatcup 12', such that liner 24' opens to its normally open position and milk is withdrawn from teat 16'. Source 48' supplies negative pressure, i.e. vacuum, of about 50 kPa, which, due to losses through container 44', claw 36, and the respective connection tubes, results in the above noted preferred vacuum in the mouthpiece chamber at the upper section of the liner.

The description relative to FIGS. 3–6 is taken from U.S. Pat. No. 5,069,162, incorporated herein by reference, and includes the same reference characters. Referring to FIG. 3, a teatcup 1 is illustrated. The teatcup 1 is particularly useful for placing over a teat of a cow's udder for milking the cow by machine. The teatcup 1 comprises a central shell 3, an upper shell 5, a retainer 6, and an end cap 7. The central shell 3 is generally shaped as a tubular cylinder having a wall 8 with an upper section 9 and a lower section 11. The central shell lower section 11 has external threads 13 and an external groove 15 located between the threads 13 and the central shell lower end 17. The central shell further comprises a vacuum tube 19 that is joined to and opens into the interior of the tubular wall 8. The wall 8 defines a series of external annular grooves 21 in the upper section 9 and a keyway 23 that extends from the shell upper end 25 to the grooves 21. The upper shell 5 is a hollow cylinder having a wall 26 and an annular flange 27 extending radially from its upper end. The lower end 28 of the upper shell is formed with an internal chamfer 29. The upper shell cylinder wall 26 also has an inwardly projecting lug 31 between the flange 27 and the lower end 28. The teatcup end cap 7 has an upper end with internal threads that mate with the central shell threads 13. The cap lower end is formed with a connection tip 33. The central shell 3 and the cap 7 are fabricated from a transparent plastic. The upper shell 5 is fabricated from stainless steel. The retainer 6 is preferably manufactured from a molded rubber material. The retainer has a first internal groove that conforms to the flange 27 of the upper shell 5. The retainer also has a second internal groove 37. The liner 39 is inserted into the teatcup 1. The liner 39 is fabricated generally as an elongated tubular member having a wall 40 that is concentric about a longitudinal axis 42. The liner is divided into a lower barrel LB, and an upper barrel UB, and a mouthpiece chamber MC.

Looking also at FIG. 4, the liner lower barrel LB extends from the liner lower end 39 to approximately the longitudinal midpoint 49. The liner wall 40 of the lower barrel is formed with a cross-section in the form of a continuous band of alternating and parallel external flutes 45 and internal flutes 47. In its unassembled condition, the lower barrel cross-section is substantially constant, and the flutes 45 and 47 are parallel to the axis 42. The portion of the liner 40 between the midpoint 49 thereof and the liner upper end 43 is divided into the upper barrel UB and the mouthpiece chamber MC. For the length of the upper barrel, the wall 40 is defined by flutes 45 and 47 that are continuations of the respective flutes on the liner lower barrel LB. However, the wall 40 of the upper barrel gradually diverges toward the liner upper end 43 so as to impart a taper to the upper barrel. From its junction with the upper barrel UB, the wall 40 of the liner mouthpiece chamber MC continues to diverge toward the liner upper end 43. In addition, the cross-section of the wall at the mouthpiece chamber is different that at the upper barrel and at the lower barrel LB. As further shown in FIG. 6, the liner wall for a length F of the mouthpiece chamber is fabricated only with internal flutes 47. The corresponding exterior surface of the liner wall is formed without exterior flutes but rather as a frusto-conical surface 51. From the upper end of the length F of the mouthpiece chamber MC, the liner wall 40 blends into an annular band 53 of material. The band 53 defines an inner diameter sized to the same dimension as the outer diameter of a retaining ring 55. A washer-like mouthpiece 57 having an internal surface 59 connects to the mouthpiece chamber band 53. The liner lower end 41 is formed with an outwardly extending annular projection 61. Also see FIG. 5. The outer diameter of the projection 61 is larger than the envelope 62 of the liner external flutes 45. The liner 39 is made from a flexible elastomer. While silicon rubber is a preferred material, other elastomers are also acceptable. A thickness of approximately 0.08 inches for the liner wall 40 works very well.

To assemble and use the teatcup 1, the retainer 6 is pressed onto the upper shell 5 such that the upper shell flange 27 engages the first groove 35 of the retainer. The retaining ring 55 is installed in the inner diameter of the liner band 53. The fact that the liner band is pre-sized to the outer diameter of the retaining ring 55 eliminates the requirement of a special tool for installing the retaining ring. Then the upper shell 5 is pushed onto the central shell, with the upper shell lug 30 engaging the central shell keyway 23. Then the liner lower end 41 is inserted through the assembled upper shell and retainer, and the liner mouthpiece chamber band 53 is seated in the retainer second groove 37. The lower end 41 of the liner 39 is folded outwardly to curl around the lower end 17 of the central shell 3. The liner projection 61 is designed to fit within the groove 15 near the lower end of the central shell. The cap 7 is screwed onto the central shell by means of the threads 13 on the central shell and cooperating internal threads on the cap. The upper shell is pushed up the central shell, stretching the liner, and the sealing ring 63 is installed in a selected groove 21 of the central shell 3.

In operation, a flexible hose 38' is connected to the teatcup tip 33, and a steady vacuum is applied to the hose. The mouthpiece internal surface 59 of the liner 39 is slipped over a cow's teat such that the teat enters the mouthpiece chamber MC and the upper barrel UB. The vacuum induced in the interior of the liner through the tip 33 causes atmospheric pressure to collapse the liner barrel around the teat to hold the liner and thus the teatcup in place. A second hose 52' is connected to the vacuum tube 19 of the central shell 3. A pulsating vacuum is applied to the vacuum tube 19 and thus to the interior of the central shell 3 and to the exterior of the liner 39. As a result, the inflation upper barrel UB and lower barrel LB alternately expand and collapse radially about axis 42 in a continuous manner, the vacuum causing the teat to express milk into the interior of the liner and out the tip 33, and the collapse massaging the teat end, thereby preventing discomfort and tissue damage which a constant vacuum tends to produce.

PRESENT INVENTION

FIG. 7 shows a teatcup liner provided by an elongated flexible generally tubular rubber liner 104 extending along a longitudinal axis 105. The liner has an upper section 106, FIGS. 7–10, for mounting to a teatcup as at ring 55, FIG. 3, a mouthpiece chamber 107, FIG. 14, including a shoulder 108 below the upper section, and a barrel 110 below the shoulder. The barrel has alternating exterior and interior axially extending flutes 112 and 114, respectively. Shoulder 108 is fluteless along both its exterior 116 and its interior 118, FIGS. 7, 8, 11. The shoulder has a constant inner radius and a constant outer radius in a plane normal to axis 105.

This is shown in FIG. 11 at constant inner radius 120 of the shoulder and constant outer radius 122 of the shoulder, as compared to an inner radius of the barrel which varies between the radii shown at 124 and 126, and an outer radius of the barrel which varies between the radii shown at 128 and 130.

Referring to FIG. 14, exterior flute 112 of barrel 110 transitions to shoulder 108 along a first arc 132 having a positive radius of curvature 134 of absolute value r1. Interior flute 114 of barrel 110 transitions to shoulder 108 along a second arc 136 having a positive radius of curvature 138 of absolute value r2, then along a third arc 140 having a negative radius of curvature 142 of absolute value r3, then along a fourth arc 144 having apositive radius of curvature 146 of absolute value r4. The focal point 148 for radius 134 of arc 132 is exterior to liner 110. The focal point 150 for radius 138 of arc 136 is exterior to liner 110. The focal point 152 for radius 142 of arc 140 is interior to liner 110. The focal point 154 for radius 146 of arc 144 is exterior to liner 110. In the preferred embodiment, r1=r4, and r4>r3>r2. Focal point 148 is axially spaced from upper section 106 of the liner by a first axial distance d1 as shown at 156. Focal point 150 is axially spaced from upper section 106 of the liner by a second axial distance d2 as shown at 158. Focal point 152 is axially spaced from upper section 106 of the liner by a third axial distance d3 as shown in 160. Focal point 154 is axially spaced from upper section 106 of the liner by a fourth axial distance d4 as shown at 162. In the preferred embodiment, d1=d4, and d2>d4>d3.

FIGS. 15–17 show an alternate embodiment. Teatcup liner is provided by an elongated flexible, generally tubular rubber liner 204 extending along a longitudinal axis and having an upper section 206 for mounting to a teatcup, a mouthpiece chamber 207 including a shoulder 208 below the upper section, a barrel 210 below the shoulder, and a lower section 212. Liner 204 is of standard construction known in the prior art except for the above described mouthpiece chamber shoulder and transition geometry. FIG. 18 shows liner 204 in a teat cup shell 214, and shows commonly used teat cup assembly terminology, for clarity and understanding. The liner includes an upper mouthpiece lip 216 having a mouthpiece diameter 218, a mouthpiece chamber MPC 207 having shoulder or throat 208, a cuff or skirt 220 fitted over shell seat 222, a liner bore 224 measured at 75 millimeters, 3 inches, from the mouthpiece lip, a wall thickness 226 of the barrel, a short milk tube diameter 228, and milk tube reinforcement rippled section 230. The liner has a shell retainer groove 232, called a bung on some liners, engaging the lower apertured end of the shell. The shell has an air nipple 234 for connection to tube 52', FIG. 1. In commonly used teat cup assembly terminology, section 236 is the mouthpiece or head, section 238 is the barrel, and section 240 is the short milk tube.

It is recognized that various equivalents, alternatives and modifications are possible within the scope of the appended claims. The claims cover varying numbers of longitudinal flutes, including four or more.

I claim:

1. A teatcup liner comprising an elongated flexible generally tubular liner extending along a longitudinal axis, said liner having an upper section for mounting to a teatcup, a mouthpiece chamber including a shoulder below said upper section, and a barrel below said shoulder, said barrel having alternating exterior and interior axially extending flutes, said shoulder being fluteless along both its exterior and interior, wherein:

said shoulder has a constant inner radius and a constant outer radius in a plane normal to said axis;

said exterior flute of said barrel transitions to said shoulder along a first arc having a positive radius of curvature;

said interior flute of said barrel transitions to said shoulder along a second arc having a positive radius of curvature, then along a third arc having a negative radius of curvature, then along a fourth arc having a positive radius of curvature.

2. The teatcup liner according to claim 1 wherein:

the focal point for the radius of said first arc is exterior to said liner;

the focal point for the radius of said second arc is exterior to said liner;

the focal point for the radius of said third arc is interior to said liner;

the focal point for the radius of said fourth arc is exterior to said liner.

3. The teatcup liner according to claim 2 wherein said focal point for the radius of said first arc is axially spaced from said upper section of said liner by an axial distance equal to the axial distance spacing said focal point for the radius of said fourth arc from said upper section of said liner.

4. The teatcup liner according to claim 2 wherein:

said focal point for the radius of said first arc is axially spaced from said upper section of said liner by a first axial distance d1;

said focal point for the radius of said second arc is axially spaced from said upper section of said liner by a second axial distance d2;

said focal point for the radius of said third arc is axially spaced from said upper section of said liner by a third axial distance d3;

said focal point for the radius of said fourth arc is axially spaced from said upper section of said liner by a fourth axial distance d4;

d2>d4>d3.

5. The teatcup liner according to claim 4 wherein d1=d4.

6. The teatcup liner according to claim 1 wherein said radius of said first arc equals said radius of said fourth arc.

7. The teatcup liner according to claim 1 wherein:

the radius of said first arc has an absolute value r1;

the radius of said second arc has an absolute value r2;

the radius of said third arc has an absolute value r3;

the radius of said fourth arc has an absolute value r4;

r4>r3>r2.

8. The teatcup liner according to claim 7 wherein r1=r4.

9. A teatcup liner comprising:

an elongated flexible generally tubular liner extending along a longitudinal axis;

said liner having an upper section for mounting to a teatcup;

said liner having a mouthpiece chamber including a shoulder below said upper section;

said liner having a barrel below said shoulder;

said barrel having alternating exterior and interior axially extending flutes;

said shoulder being fluteless along both its exterior and interior;

said shoulder having a constant inner radius and a constant outer radius in a plane normal to said axis;

said exterior flute of said barrel transitioning to said shoulder along a first arc having a positive radius of curvature of absolute value r1;

said interior flute of said barrel transitioning to said shoulder along a second arc having a positive radius of curvature of absolute value r2, then along a third arc having a negative radius of curvature of absolute value r3, then along a fourth arc having a positive radius of curvature of absolute value r4;

the focal point for the radius of said first arc being exterior to said liner and axially spaced from said upper section of said liner by a first axial distance d1;

the focal point for the radius of said second arc being exterior to said liner and axially spaced from said upper section of said liner by a second axial distance d2;

the focal point for the radius of curvature of said third arc being interior to said liner and axially spaced from said upper section of said liner by a third axial distance d3;

the focal point for the radius of said fourth arc being exterior to said liner and axially spaced from said upper section of said liner by a fourth axial distance d4;

d1=d4;

r1=r4;

d2>d1>d3;

r1>r3>r2.

10. A method of maintaining desired mouthpiece chamber vacuum in a teatcup liner which is a flexible generally tubular member having a longitudinal axis and a wall with first and second ends, the tubular member having a lower barrel adjacent the first end, a mouthpiece chamber adjacent the second end, and an upper barrel intermediate the lower barrel and the mouthpiece chamber, the wall of the tubular member upper and lower barrels being formed as a continuous band of alternating exterior and interior flutes, the exterior flutes lying within an envelope of predetermined diameter, said method comprising modifying said liner to provide more effective sealing of a teat inserted therein comprising providing a transition from said flutes of said upper barrel to a constant inner radius shoulder in said mouth piece chamber in a radial plane at a tangent between said upper barrel and said shoulder, said transition plane being substantially above the bottom of the teat inserted into said liner.

11. The method of claim 10 comprising maintaining said mouthpiece chamber vacuum in the range of 10 to 20 kPa for a wide range of teat sizes and shapes.

* * * * *